(12) United States Patent
Cavaliere et al.

(10) Patent No.: US 9,894,960 B2
(45) Date of Patent: Feb. 20, 2018

(54) METHOD OF VACUUM FORMING A FOOTWEAR UPPER

(71) Applicant: NIKE, Inc., Beaverton, OR (US)

(72) Inventors: Sergio Cavaliere, Venice (IT); Giovanni Adami, Montebelluna TV (IT)

(73) Assignee: NIKE, Inc., Beaverton, OR (US)

( * ) Notice: Subject to any disclaimer, the term of this patent is extended or adjusted under 35 U.S.C. 154(b) by 507 days.

(21) Appl. No.: 14/263,137

(22) Filed: Apr. 28, 2014

(65) Prior Publication Data
US 2015/0305448 A1    Oct. 29, 2015

(51) Int. Cl.
*B29C 69/00* (2006.01)
*B29C 51/42* (2006.01)
(Continued)

(52) U.S. Cl.
CPC .......... *A43B 23/025* (2013.01); *A43D 3/027* (2013.01); *A43D 3/04* (2013.01); *B29C 51/06* (2013.01); *B29C 51/268* (2013.01); *B29C 51/421* (2013.01); *B29C 51/46* (2013.01); *B29C 65/02* (2013.01); *B29C 66/133* (2013.01); *B29C 66/54* (2013.01); *B29C 66/81427* (2013.01); *B29C 69/00* (2013.01); *A43B 23/0295* (2013.01);
(Continued)

(58) Field of Classification Search
CPC .......... A43D 11/12; A43D 3/00; A43D 8/003; A43D 8/027; A43D 21/00; B29C 51/10; B29C 69/00; B29C 66/54; B29C 66/133; B29C 65/02; B29C 66/81427; B29C 51/06; B29C 51/268; B29C 51/421; B29C 51/46; B29C 66/71; B29C 66/81422; B29C 65/04; B29C 65/26; B29C 65/18; B29C 2791/001; B29C 2791/007; B29C 2791/006; B29C 51/08; B29C 51/445; A43B 23/025; A43B 23/0295; B29L 2031/50; B29L 2031/505; B29K 2023/083; B29K 2075/00
USPC ...... 12/145, 146 C, 54.1; 156/212, 213, 245, 156/285, 228, 308.4, 292; 264/553, 554
See application file for complete search history.

(56) References Cited

U.S. PATENT DOCUMENTS 2,648,079 A    8/1953  Ushakoff
3,720,971 A *  3/1973  Wyness ............ A43D 8/006
                                        12/146 C
(Continued)

FOREIGN PATENT DOCUMENTS

DE    42 00 011 A1    7/1993
EP    2 206 595 A1    7/2010
(Continued)

OTHER PUBLICATIONS

International Search Report and Written Opinion dated Jun. 2, 2015 in PCT/US2015/015117.

*Primary Examiner* — Khoa Huynh
*Assistant Examiner* — Jocelyn Wu
(74) *Attorney, Agent, or Firm* — Quinn IP Law

(57) ABSTRACT

A method of making an article of footwear may include applying an environmental pressure differential across a sheet of upper material to conform the sheet of upper material to a portion of a footwear last, thereby forming at least a portion of an upper of the article of footwear. In addition, the method may include assembling the article of footwear including fixedly attaching the upper of the article of footwear to a sole structure.

16 Claims, 18 Drawing Sheets

(51) Int. Cl.

| | |
|---|---|
| *B29C 65/04* | (2006.01) |
| *B29C 51/10* | (2006.01) |
| *A43D 21/00* | (2006.01) |
| *A43B 23/02* | (2006.01) |
| *A43D 3/04* | (2006.01) |
| *B29C 65/02* | (2006.01) |
| *B29C 51/06* | (2006.01) |
| *B29C 51/26* | (2006.01) |
| *B29C 51/46* | (2006.01) |
| *B29C 65/00* | (2006.01) |
| *A43D 3/02* | (2006.01) |
| *B29C 51/08* | (2006.01) |
| *B29C 51/44* | (2006.01) |
| *B29C 65/18* | (2006.01) |
| *B29C 65/26* | (2006.01) |

(52) U.S. Cl.
CPC .............. *A43D 21/00* (2013.01); *B29C 51/08* (2013.01); *B29C 51/10* (2013.01); *B29C 51/445* (2013.01); *B29C 65/04* (2013.01); *B29C 65/18* (2013.01); *B29C 65/26* (2013.01); *B29C 66/71* (2013.01); *B29C 66/81422* (2013.01); *B29C 2791/001* (2013.01); *B29C 2791/006* (2013.01); *B29C 2791/007* (2013.01)

(56) References Cited

U.S. PATENT DOCUMENTS

| | | | | |
|---|---|---|---|---|
| 4,267,142 A | * | 5/1981 | Lankheet | B29C 70/44 264/102 |
| 5,116,216 A | * | 5/1992 | Cochran | B29C 70/44 156/286 |
| 5,236,646 A | * | 8/1993 | Cochran | B29C 70/44 156/286 |
| 5,253,434 A | * | 10/1993 | Curley, Jr. | A43B 23/07 12/142 F |
| 5,709,954 A | | 1/1998 | Lyden et al. | |
| 5,940,991 A | | 8/1999 | Cabalquinto | |
| 6,558,784 B1 | * | 5/2003 | Norton | A43B 5/002 12/146 C |
| 6,670,029 B2 | * | 12/2003 | Norton | A43B 5/002 12/145 |
| 2002/0012784 A1 | * | 1/2002 | Norton | A43B 5/002 428/304.4 |
| 2002/0071946 A1 | * | 6/2002 | Norton | A43B 5/002 428/304.4 |
| 2002/0172792 A1 | * | 11/2002 | Jarvis | B29C 65/5021 428/57 |
| 2009/0295015 A1 | * | 12/2009 | Kuntz | B29C 33/308 264/135 |
| 2010/0143525 A1 | * | 6/2010 | Kuntz | B29C 33/308 425/342.1 |
| 2011/0078922 A1 | | 4/2011 | Cavaliere et al. | |
| 2012/0211928 A1 | * | 8/2012 | Takai | B29C 51/10 264/553 |

FOREIGN PATENT DOCUMENTS

| | | |
|---|---|---|
| GB | 1 300 931 A | 12/1972 |
| JP | 3-184828 A | 8/1991 |
| JP | 2002-67137 A | 3/2002 |
| WO | 2011/041053 A1 | 4/2011 |
| WO | 2015167645 A1 | 11/2015 |

* cited by examiner

METHOD OF VACUUM FORMING A FOOTWEAR UPPER

BACKGROUND

The present invention relates generally to a method of making an article of footwear and, more particularly, to a method of vacuum forming an upper for an article of footwear.

Articles of athletic footwear often include two primary elements, an upper and a sole structure. The upper provides a comfortable covering for the foot and securely positions the foot with respect to the sole structure. The sole structure is secured to a lower portion of the upper (for example, through adhesive bonding) and is generally positioned between the foot and the ground. In addition to attenuating ground reaction forces (that is, providing cushioning) during walking, running, and other ambulatory activities, the sole structure may influence foot motions (for example, by resisting pronation), impart stability, and provide traction. Accordingly, the upper and the sole structure operate cooperatively to provide a comfortable structure that is suited for a wide variety of athletic activities.

The upper is often formed from a plurality of material elements (for example, textiles, polymer sheets, foam layers, leather, and/or synthetic leather) that are stitched, adhesively bonded, and/or thermally bonded (welded) together to form a void on the interior of the footwear for receiving a foot. More particularly, the upper forms a structure that extends over instep and toe areas of the foot, along medial and lateral sides of the foot, and around a heel area of the foot.

The sole structure may include one or more components. For example, the sole structure may include a ground-contacting sole component. The ground-contacting sole component may be fashioned from a durable and wear-resistant material (such as rubber or plastic), and may include ground-engaging members, tread patterns, and/or texturing to provide traction.

In addition, in some embodiments, the sole structure may include a midsole and/or a sockliner. The midsole, if included, may be secured to a lower surface of the upper and forms a middle portion of the sole structure. Many midsole configurations are primarily formed from a resilient polymer foam material, such as polyurethane or ethylvinylacetate, that extends throughout the length and width of the footwear. The midsole may also incorporate fluid-filled chambers, plates, moderators, or other elements that further attenuate forces, influence the motions of the foot, or impart stability, for example. The sockliner is a thin, compressible member located within the upper and positioned to extend under a lower surface of the foot to enhance footwear comfort.

The footwear components discussed above may be assembled together using various methods, including, for example, stitching, adhesives, welding, and other joining techniques. Articles of footwear may be assembled, at least in part, on a structure called a "last." A last is a form having the general shape of a human foot. During manufacturing, an article of footwear may be assembled around a last, in order to create a shoe with the desired shape. For example, upper materials/panels may be assembled, or otherwise placed, on a last. Then other components, such as midsole components and/or ground-contacting components may be attached to the upper, while fitted on the last. A last is typically not shaped like any particular type of foot, but rather is formed having a shape wherein the dimensions are averages of many different foot types, in order to produce a shoe that fits a variety of foot types.

In some cases, the upper of the shoe may be assembled from a plurality of panels of material that are joined to one another to form the shape of the upper in the shape of a foot. This type of construction may facilitate the shaping of the contoured shapes of the shoe. It is desirable to reduce the number of panels utilized to form the upper. Reducing the number of panels may reduce weight because materials used to join the panels to one another, such as stitching and adhesives, may also be reduced. In addition, a closer and/or smoother fit may be provided by reducing the number of seams between panels. Further, for sports like soccer, where the foot is used to contact a game ball, kicking accuracy and comfort may be increased by reducing the number of seams in the upper.

Material may be formed into large contoured panels for uppers of footwear. For example, in some cases, an upper may be formed in two halves, including a medial half and a lateral half, by form pressing a sheet of upper material. For example, a positive, last-shaped mold having the shape of a last may be pressed into a negative, last-shaped mold with a sheet of upper material between the positive mold and the negative mold. It is desirable to form panels of an upper to have the contours of a shoe, while substantially maintaining a consistent thickness of the panels in tightly curved areas of the contoured sheet.

The present disclosure is directed to improvements in contouring of sheet material for footwear uppers.

SUMMARY

The present disclosure is directed to a method of manufacturing an article of footwear including contouring an upper by vacuum forming one or more panels from a sheet of upper material. The contoured upper is then joined with a sole structure to assemble the article of footwear.

In one aspect, the present disclosure is directed to a method of making an article of footwear. The method may include applying an environmental pressure differential across a sheet of upper material to conform the sheet of upper material to a portion of a footwear last, thereby forming at least a portion of an upper of the article of footwear. In addition, the method may include assembling the article of footwear including fixedly attaching the upper of the article of footwear to a sole structure.

In another aspect, the present disclosure is directed to a method of making an article of footwear. The method may include positioning a sheet of upper material within a chamber, the sheet dividing the chamber into a first compartment on a first side of the sheet and a second compartment on a second side of the sheet. The method may also include positioning at least a portion of a footwear last in the first compartment on the first side of the sheet of upper material. Further, the method may include applying an environmental pressure differential across the sheet of upper material wherein a first environmental pressure in the first compartment is lower than a second environmental pressure in the second compartment, wherein the environmental pressure differential draws the sheet of upper material against the footwear last thereby forming at least a portion of an upper of the article of footwear. In addition, the method may include assembling the article of footwear including fixedly attaching the upper of the article of footwear to a sole structure.

In another aspect, the present disclosure is directed to a method of making an article of footwear. The method may include positioning a sheet of upper material within a chamber, the sheet dividing the chamber into a first compartment on a first side of the sheet and a second compartment on a second side of the sheet, and positioning at least a portion of a footwear last in the first compartment on the first side of the sheet of upper material. The method may also include applying an environmental pressure differential across the sheet of upper material wherein a first environmental pressure in the first compartment is lower than a second environmental pressure in the second compartment, wherein the sheet has a first surface on the first side of the sheet and a second surface on a second side of the sheet. In addition, gases under the second environmental pressure may exert force against the entire second surface of the sheet within the first compartment, thereby pressing the first side of the sheet against the footwear last thereby conforming a portion of the sheet to the surface of the footwear last to form at least a portion of an upper of the article of footwear. Further, the method may include assembling the article of footwear including fixedly attaching the upper of the article of footwear to a sole structure.

Other systems, methods, features and advantages of the invention will be, or will become, apparent to one of ordinary skill in the art upon examination of the following figures and detailed description. It is intended that all such additional systems, methods, features and advantages be included within this description and this summary, be within the scope of the invention, and be protected by the following claims.

BRIEF DESCRIPTION OF THE DRAWINGS

The invention can be better understood with reference to the following drawings and description. The drawings are schematic and, therefore, the components in the figures are not necessarily to scale, emphasis instead being placed upon illustrating the principles of the invention. Moreover, in the figures, like reference numerals designate corresponding parts throughout the different views.

DETAILED DESCRIPTION

Figure 1:
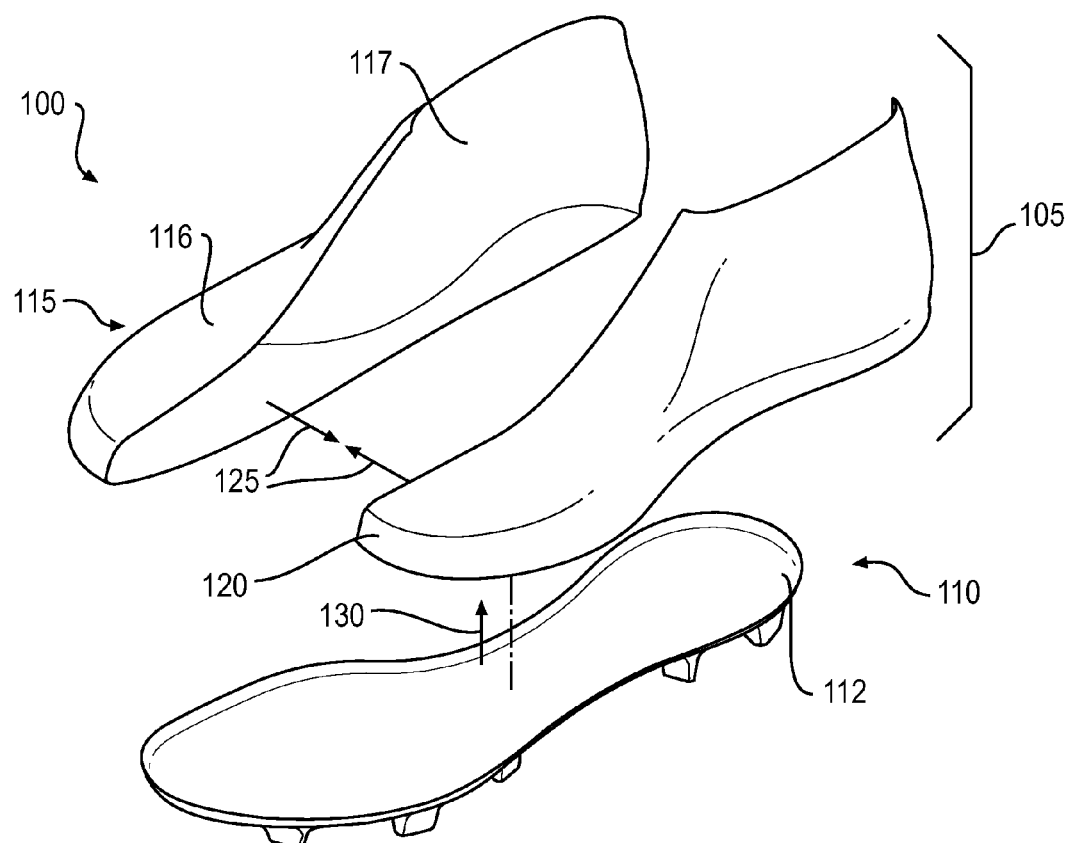
FIG. 1 is a schematic illustration of an exploded view of an exemplary article of footwear.

The following discussion and accompanying figures disclose systems and methods for manufacturing an article of footwear. Concepts associated with the disclosed systems and methods may be applied to a variety of footwear types, including athletic shoes, dress shoes, casual shoes, or any other type of footwear.

For consistency and convenience, directional adjectives are employed throughout this detailed description corresponding to the illustrated embodiments. The term "longitudinal," as used throughout this detailed description and in the claims, refers to a direction extending a length of a sole structure, i.e., extending from a forefoot portion to a heel portion of the sole. The term "forward" is used to refer to the general direction in which the toes of a foot point, and the term "rearward" is used to refer to the opposite direction, i.e., the direction in which the heel of the foot is facing.

The term "lateral direction," as used throughout this detailed description and in the claims, refers to a side-to-side direction extending a width of a sole. In other words, the lateral direction may extend between a medial side and a lateral side of an article of footwear, with the lateral side of the article of footwear being the surface that faces away from the other foot, and the medial side being the surface that faces toward the other foot.

The term "lateral axis," as used throughout this detailed description and in the claims, refers to an axis oriented in a lateral direction.

The term "horizontal," as used throughout this detailed description and in the claims, refers to any direction substantially parallel with the ground, including the longitudinal direction, the lateral direction, and all directions in between. Similarly, the term "side," as used in this specification and in the claims, refers to any portion of a component facing generally in a lateral, medial, forward, and/or rearward direction, as opposed to an upward or downward direction.

The term "vertical," as used throughout this detailed description and in the claims, refers to a direction generally perpendicular to both the lateral and longitudinal directions. For example, in cases where a sole is planted flat on a ground surface, the vertical direction may extend from the ground surface upward. It will be understood that each of these directional adjectives may be applied to individual components of a sole. The term "upward" refers to the vertical direction heading away from a ground surface, while the term "downward" refers to the vertical direction heading towards the ground surface. Similarly, the terms "top," "upper," and other similar terms refer to the portion of an object substantially furthest from the ground in a vertical direction, and the terms "bottom," "lower," and other similar terms refer to the portion of an object substantially closest to the ground in a vertical direction.

For purposes of this disclosure, the foregoing directional terms, when used in reference to an article of footwear, shall refer to the article of footwear when sitting in an upright position, with the sole facing groundward, that is, as it would be positioned when worn by a wearer standing on a substantially level surface.

In addition, for purposes of this disclosure, the term "fixedly attached" shall refer to two components joined in a manner such that the components may not be readily separated (for example, without destroying one or both of the components). Exemplary modalities of fixed attachment may include joining with permanent adhesive, rivets, stitches, nails, staples, welding or other thermal bonding, and/or other joining techniques. In addition, two components may be "fixedly attached" by virtue of being integrally formed, for example, in a molding process.

Further, for purposes of this disclosure, the term "vacuum" shall refer to the substantial absence of substance from a chamber. For example, removal of substantially all gases from a chamber may constitute drawing a vacuum. It will be understood that a "vacuum," as referred to herein, may encompass environments containing minimal gases at a minimal pressure. In addition, it will be understood that, in some embodiments described herein, a pressure differential may be created merely by reducing pressure below atmospheric pressure in one portion of a partitioned chamber.

Since the present disclosure is directed to apparatuses and methods for manufacturing articles of footwear, various components of an article of footwear will be described for purposes of reference.

FIG. 1 is an exploded view of an article of footwear 100. Footwear 100 may include an upper 105 and a sole structure 110 which may be fixedly attached to upper 105. In some embodiments, upper 105 may be formed by joining one or more upper portions or panels. For example, as shown in FIG. 1, upper 105 may include a first upper portion 115 and a second upper portion 120. Upper 105 may include a first outer surface 116 and a second inner surface 117.

Upper 105 may include one or more material elements (for example, textiles, foam, leather, and synthetic leather), which may be stitched, adhesively bonded, molded, or otherwise formed to define an interior void configured to receive a foot. The material elements may be selected and arranged to selectively impart properties such as durability, air-permeability, wear-resistance, flexibility, and comfort. Upper 105 may alternatively implement any of a variety of other configurations, materials, and/or closure mechanisms.

The configurations of first upper portion 115 and second upper portion 120 may vary. In some embodiments, first upper portion 115 may be a medial portion, and second upper portion 120 may be a lateral portion. In some embodiments, first upper portion 115 may be a medial half of upper 105 and second upper portion 120 may be a lateral half of upper 105. Although the medial side of the foot and the lateral side of the foot are not generally symmetrical, it will be understood that the terms "medial half" and "lateral half" define portions of the upper that are relatively similar in size, each forming approximately half of the upper. In order to assemble upper 105, first upper portion 115 and second upper portion 120 may be joined to one another, as indicated by arrows 125. First upper portion 115 and second upper portion 120 may be joined to one another using any suitable method, including stitching, adhesive, welding, and/or reinforcing strips.

Sole structure 110 may have a configuration that extends between upper 105 and the ground. As shown in FIG. 1, sole structure 110 may include a ground-contacting outer member 112. Footwear 100 may be further assembled by fixedly attaching sole structure 110 to upper 105. Sole structure 110 may be secured to upper 105 using any suitable method, such as adhesive attachment, stitching, welding, reinforcing strips, or any other suitable method.

Sole structure 110 may be formed of any suitable materials. In some configurations, the disclosed sole structure 110 may employ one or more materials disclosed in Lyden et al., U.S. Pat. No. 5,709,954, issued Jan. 20, 1998, the entire disclosure of which is incorporated herein by reference.

In addition, in some embodiments, sole structure 110 may include provisions for attenuating ground reaction forces (that is, cushioning and stabilizing the foot during vertical and horizontal loading). Further, sole structure 110 may be configured to provide traction (for example, by having ground-engaging cleats, as shown in FIG. 1), impart stability, and/or limit various foot motions, such as pronation, supination, and/or other motions.

Figure 2:
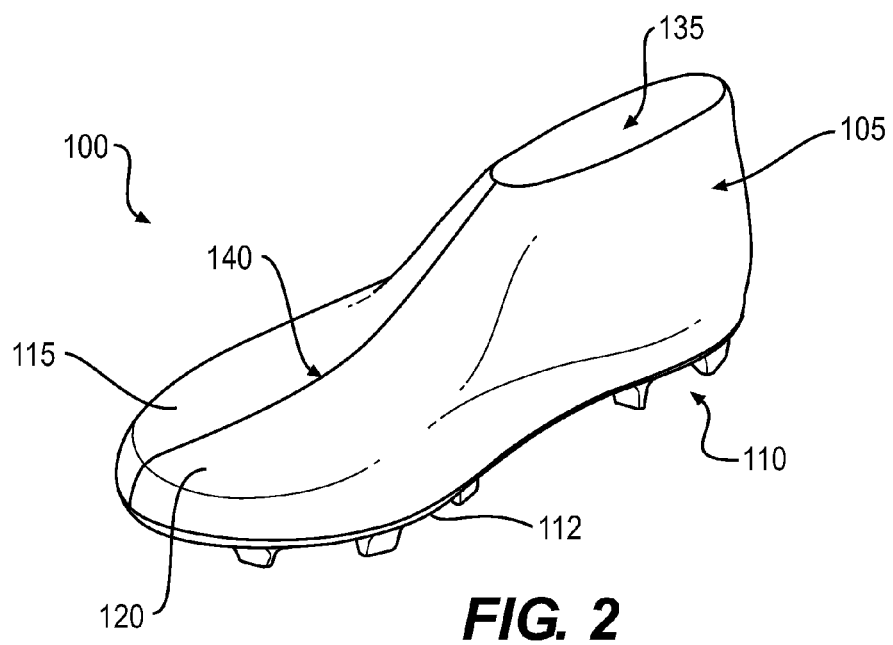
FIG. 2 is a schematic illustration of an assembled perspective view of the article of footwear shown in FIG. 1.

FIG. 2 is an assembled perspective view of footwear 100. As shown in FIG. 2. As shown in FIG. 2, first upper portion 115 and second upper portion 120 may be joined at a seam 140, thus forming upper 105 having an opening 135 for receiving the foot of a wearer.

Figure 3:
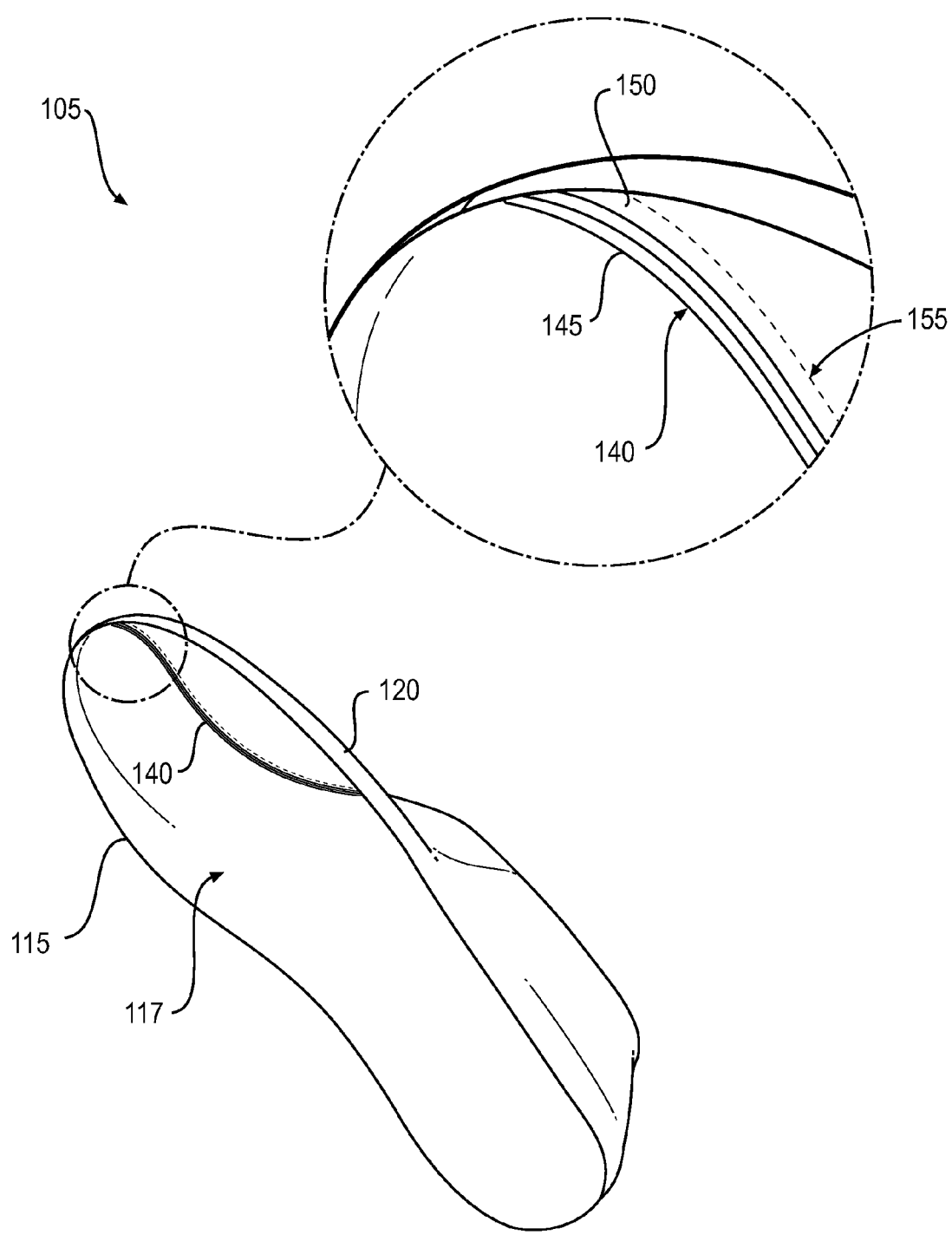
FIG. 3 is a schematic illustration of a lower perspective, cutaway view of the assembled upper of the article of footwear shown in FIG. 1.

In some embodiments, seam 140 may be formed by stitching first upper portion 115 to second upper portion 120. For example, FIG. 3 is a lower perspective, cutaway view of the assembled upper 105 of footwear 100. For purposes of illustration, a sole portion of upper 105 is not shown in FIG. 3, in order to illustrate inner surface 117 of upper 105. As shown in FIG. 3, seam 140 may be formed by joining a first flange portion 145 of first upper portion 115 to a second flange portion 150 of second upper portion 120. In some embodiments, first flange portion 145 may be joined to second flange portion 150 with stitching 155, as shown in FIG. 3.

In other embodiments, seam 140 may be formed using adhesives or welding. When joining footwear components using welding, heat may be applied to select portions of the footwear components. When exposed to sufficient heat, the polymer materials within upper portions transition from a solid state to either a softened state or a liquid state, particularly when a thermoplastic polymer material is utilized. When sufficiently cooled, the polymer materials then transition back from the softened state or the liquid state to the solid state. Based upon these properties of polymer materials, welding processes may be utilized to form a weld that joins the upper portions to each other. As utilized herein, the term "welding" or variants thereof is defined as a securing technique between two elements that involves a softening or melting of a polymer material within at least one of the elements such that the materials of the elements are secured to each other when cooled. Similarly, the term "weld" or variants thereof is defined as the thermal bond, link, or structure that joins two elements through a process that involves a softening or melting of a polymer material within at least one of the elements such that the materials of the elements are secured to each other when cooled. As examples, welding may involve (a) the melting or softening of two upper portions that include polymer materials such that the polymer materials from each upper portion intermingle with each other (e.g., diffuse across a boundary layer between the polymer materials) and are secured together when cooled and (b) the melting or softening a polymer material in a first upper portion such that the polymer material extends into or infiltrates the structure of a second upper portion (e.g., infiltrates crevices or cavities formed in the second upper portion or extends around or bonds with filaments or fibers in the second upper portion) to secure the upper portions together when cooled. Welding may occur when only one upper portion includes a polymer material or when both upper portions include polymer materials. Additionally, welding does not generally involve the use of stitching or adhesives, but involves directly bonding upper panels to each other with heat. In some situations, however, stitching or adhesives may be utilized to supplement the weld (thermal bond) or the joining of upper portions through welding.

In some embodiments, joining the first upper portion to the second upper portion includes welding the first upper portion to the second upper portion to form a thermal bond between the first upper portion and the second upper portion. A variety of techniques may be utilized to weld seams of the upper. For example, the upper may be welded using conduction heating, radiant heating, radio frequency heating, ultrasonic heating, or laser heating. By welding the upper portions to one another, adhesives and stitching may be omitted, which may reduce the weight of the upper and, therefore, reduce the weight of the overall shoe. In addition, welding may facilitate assembly of the upper.

Figure 4:
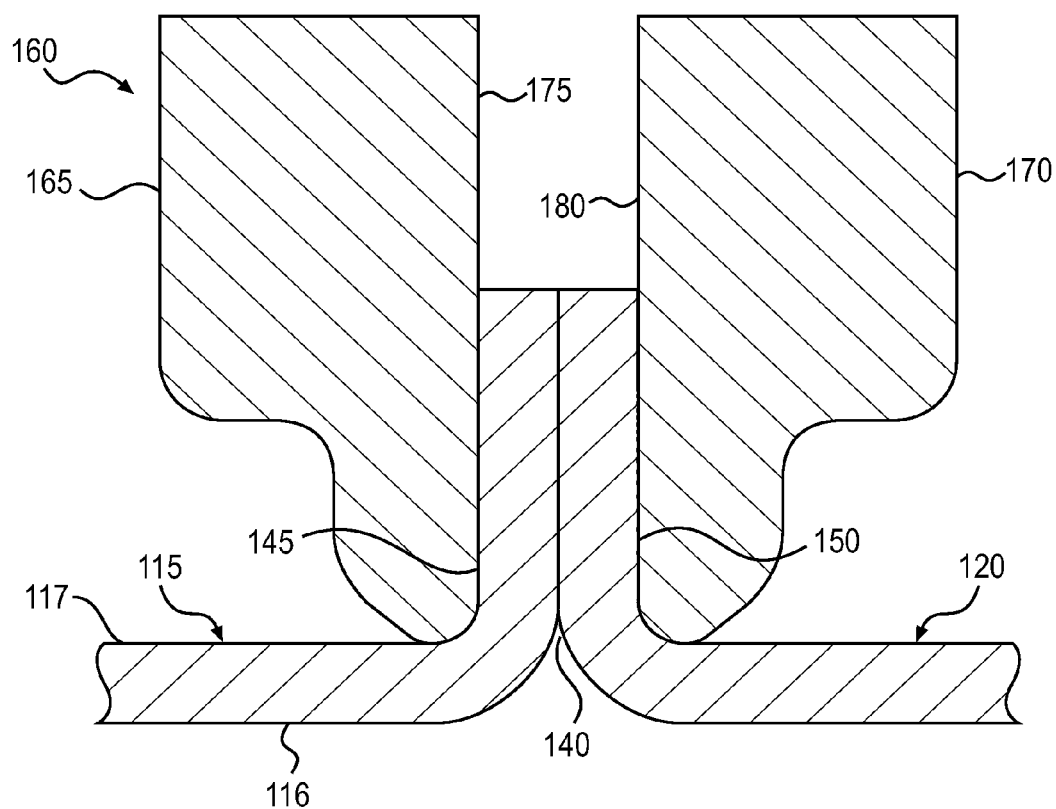
FIG. 4 is a schematic illustration of a cross-sectional view of a welding process for joining panels of a footwear upper.

FIG. 4 is a cross-sectional view of a welding process for joining portions of the footwear upper together. As shown in FIG. 4, a welding die 160 may include a first welding die component 165 and a second welding die component 170. First welding die component 165 may include a first welding surface 175 and second welding die component 170 may include a second welding surface 180. As shown in FIG. 4, first flange portion 145 and second flange portion 150 may be pressed between first welding surface 175 and second welding surface 180.

In order to weld first flange portion 145 and second flange portion 150, heat may be applied to first flange portion 145 and second flange portion 150 while pressed within die 160. In some embodiments, die 160 may be configured to apply conduction heating. Accordingly, in some embodiments, first welding die component 165 and/or second welding die component 170 may include internal heating elements or conduits that channel a heated liquid in order to sufficiently raise the temperature of welding die 160 to form a weld between first flange portion 145 and second flange portion 150. If utilized for purposes of radio frequency heating, one or both of first welding die component 165 and second welding die component 170 may emit radio frequency energy that heats the particular polymer material within first flange portion 145 and second flange portion 150.

Figure 5:
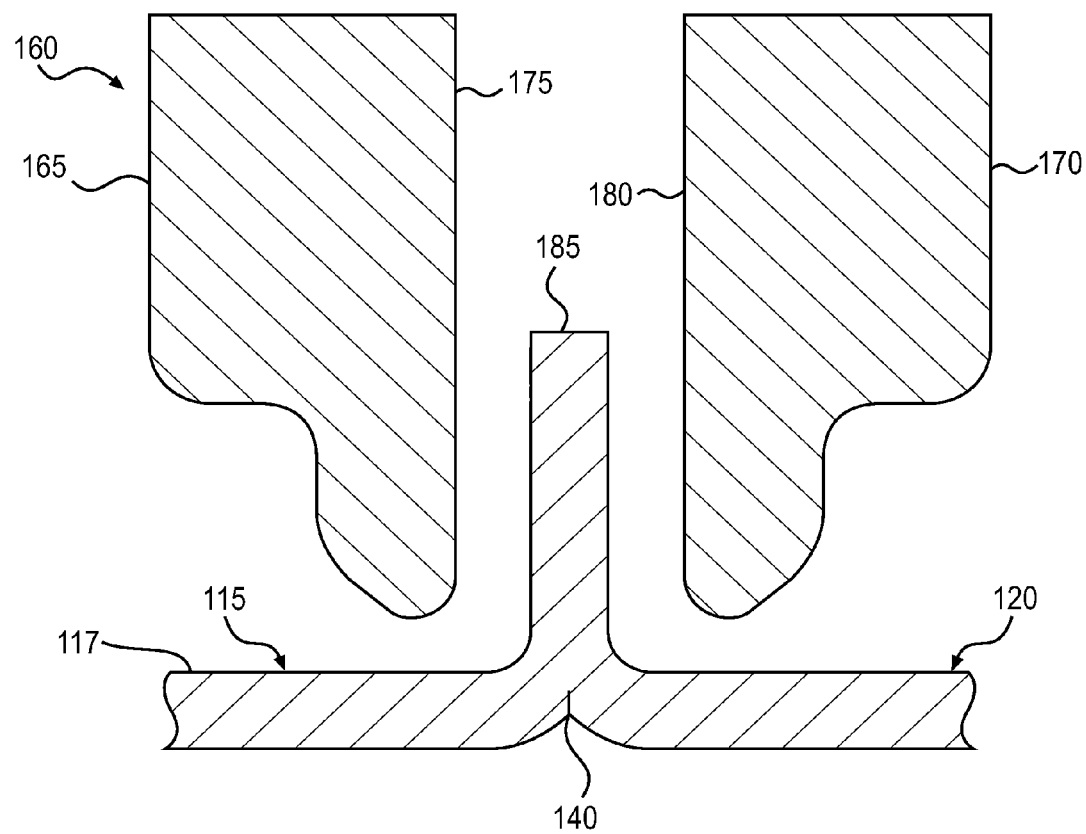
FIG. 5 is a schematic illustration of a seam that has been welded with the process shown in FIG. 4.

FIG. 5 illustrates seam 140 formed by the welding process shown and described with respect to FIG. 4. As shown in FIG. 5, a welded flange 185 may be formed between first upper portion 115 and second upper portion 120. Following the welding process, excess portions of welded flange 185 may be trimmed or otherwise removed to complete the formation of seam 140.

In some embodiments, a reinforcing strip may be used to form, or otherwise reinforce, the seam between upper portions. Using reinforcing strips may not only strengthen the seam, but may also enable the seam to be formed without using stitching or adhesive, or may enable the seam to be formed using a lighter weight stitching or lower strength adhesive.

Figure 6:
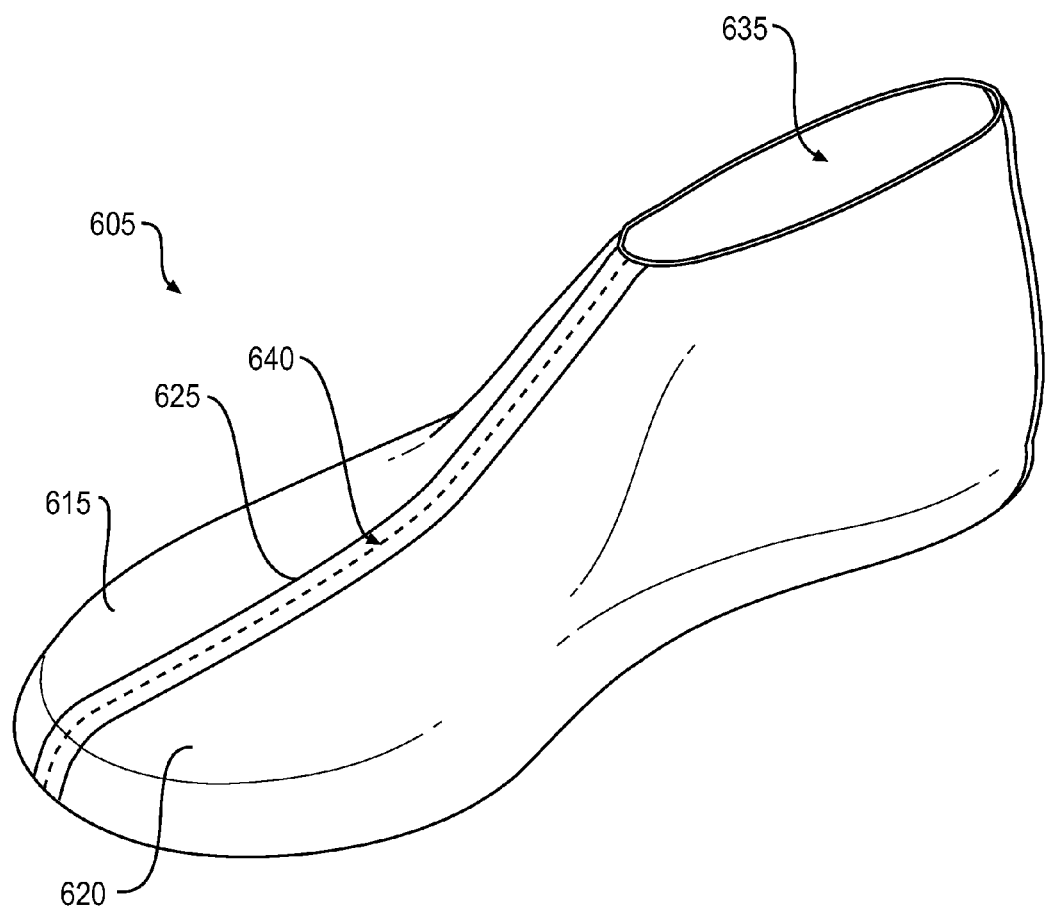
FIG. 6 is a schematic illustration of an assembled upper of an article of footwear including a reinforcing strip applied to an inner surface of the upper at the seam between panels of the upper.

FIG. 6 is a schematic illustration of an assembled upper of an article of footwear including a reinforcing strip applied to an inner surface of the upper at the seam between panels of the upper. As shown in FIG. 6, an upper 605 may include a first upper portion 615 and a second upper portion 620, which may be joined at a seam 640. FIG. 6 further illustrates an opening 635 formed by upper 605.

As shown in FIG. 6, upper 605 may include a reinforcing strip 625 affixed to the outer surfaces of first upper portion 615 and second upper portion 620 of upper 605 at seam 640. In some embodiments, reinforcing strip 625 may be the only attachment between first upper portion 615 and second upper portion 620. That is, first upper portion 615 and second upper portion 620 may be unattached to one another independent of reinforcing strip 625 (and independent of the sole structure).

Figure 7:
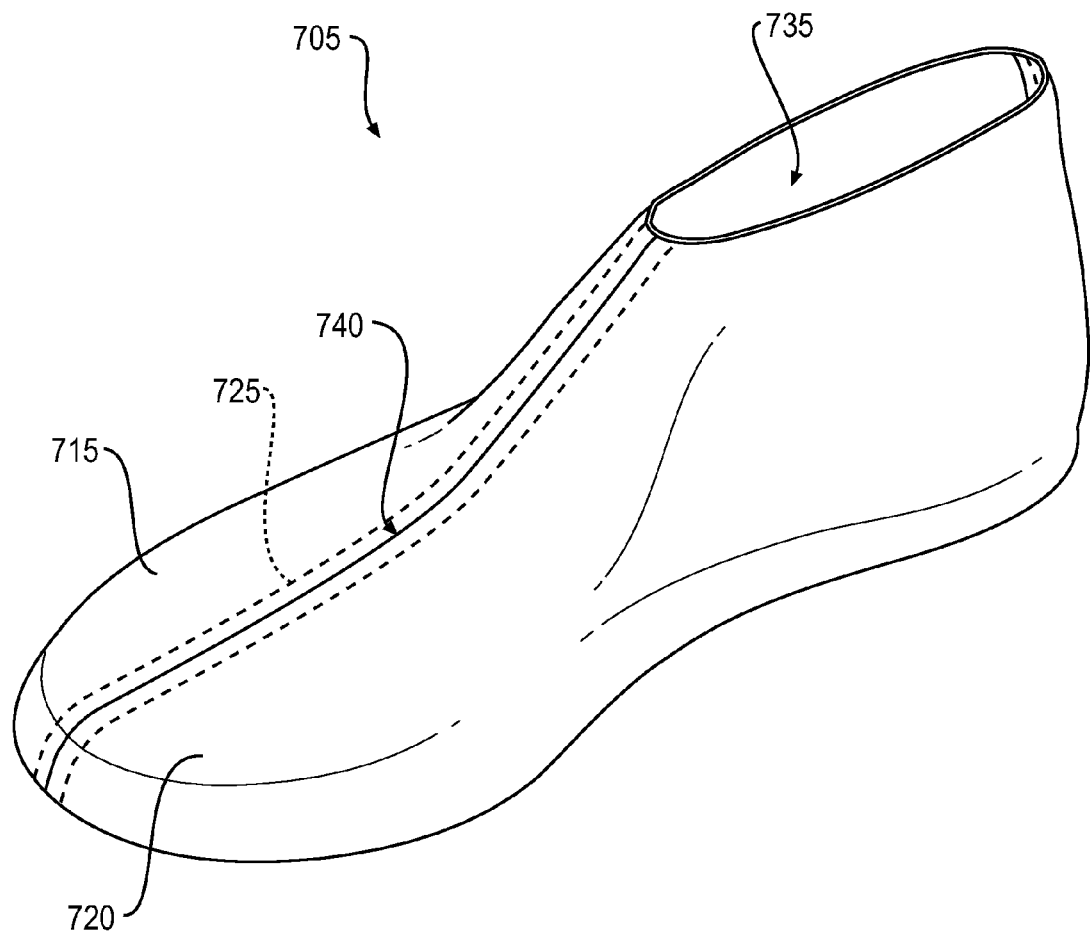
FIG. 7 is a schematic illustration of an assembled upper of an article of footwear including a reinforcing strip applied to an inner surface of the upper at the seam between panels of the upper.

In some embodiments, the reinforcing strip may be located on an inner surface of the upper. For example, FIG. 7 is a schematic illustration of an assembled upper 705 of an article of footwear including an opening 735 and a reinforcing strip 725 applied to an inner surface of upper 705. As shown in FIG. 7, reinforcing strip 725 (shown in phantom) may be affixed to the interior surface of a first upper portion 715 and a second upper portion 720 at a seam 740.

The upper portions described above may be preformed using any suitable method. In some embodiments, the upper portions may be vacuum formed. Vacuum forming may form contours of the upper while maintaining a substantially consistent thickness of the upper material at the tightly curved areas of the contoured upper.

Figure 8:
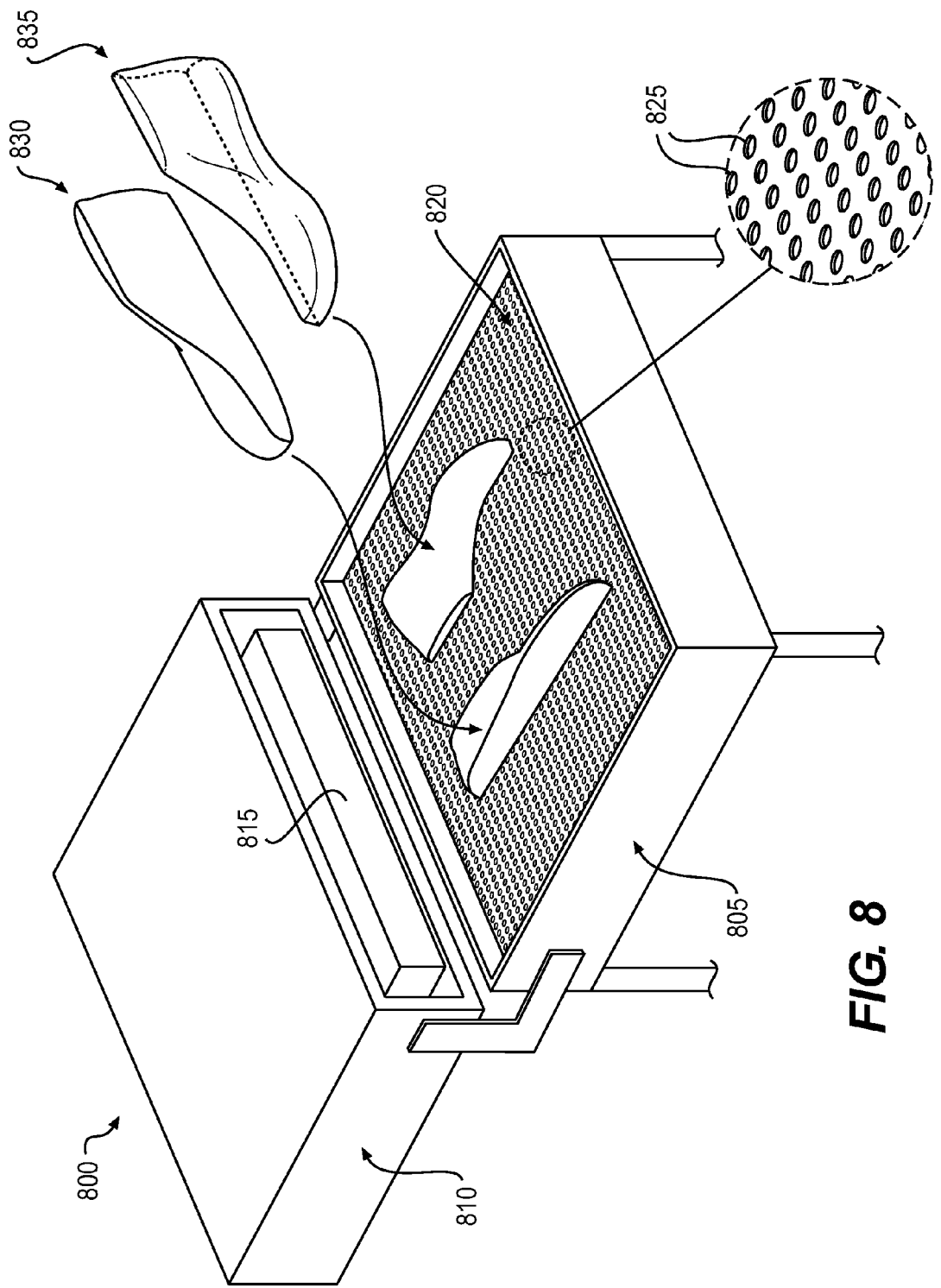
FIG. 8 is a schematic illustration of a step of inserting a medial have of a last and a lateral half of a last into a vacuum forming apparatus.

FIG. 8 is a schematic illustration of a step of inserting a first last portion 830 and a second last portion 835 into a vacuum forming apparatus 800. Apparatus 800 may include a vacuum application component 805 and a heat application component 810. Heat application component may include a heating device 815.

Vacuum application component 805 may include a perforated partition 820, which may include a plurality of perforations 825. As shown in FIG. 8, first last portion 830 and second last portion 835 into vacuum forming apparatus 800 by positioning the last portions on perforated partition 820.

First last portion 830 and second last portion 835 may form a last which may be shaped to resemble a human foot. In some embodiments, the last may be shaped to resemble a certain person's foot. For example, custom shoes may be made for an individual person using lasts made from molds taken of that person's feet. In other embodiments, the last may have a shape corresponding to a certain foot type (for example, narrow feet, wide feet, high arches, high insteps, and other various foot types). Lasts with a shape corresponding to a certain foot type may not be shaped like any one foot. Rather, such lasts may have dimensions that are averages of many different feet. For example, a last having a narrow foot type shape, may have dimensions that are averages of the dimensions of many different feet considered to be relatively narrow. The averaged dimensions result in a last that is not shaped like any particular foot, but rather has a shape that is generically that of a narrow foot type. Thus, articles of footwear assembled on such a last may be formed with an interior shape that fits a broad range of wearers having relatively narrow feet, even though each wearer's feet are unique. In some embodiments, the last may have a shape with dimensions that are averages of dimensions of many different feet having a variety of foot types. Such a shape may facilitate the manufacture of footwear that may fit a broad range of wearers having a wide variety of foot types.

The averaged dimensions result in a last that is not shaped like any particular foot. Such a last may have less surface detail than an actual foot and the contours of the last may be smoothed out in comparison to an actual foot. The result may be a last that appears, to some extent, like a mannequin or doll foot. Nevertheless, for purposes of this description and the appending claims, a last shall be considered to "resemble a human foot" not only when the last is shaped like a specific foot, but also when the last is shaped with dimensions that are averages of multiple feet. Persons of ordinary skill in the art will readily recognize the practice of forming lasts with averaged dimensions, and will, accordingly, appreciate the meaning of the term "resemble a human foot," as used in the present description and claims.

In some embodiments, the last may be formed of a single piece of material. In other embodiments, the last may be formed of multiple components. In some embodiments different last components may be formed of different materials. Exemplary materials from which the first component of the last may be formed include plastics, wood, rigid foams, and other relatively rigid materials.

Figure 9:
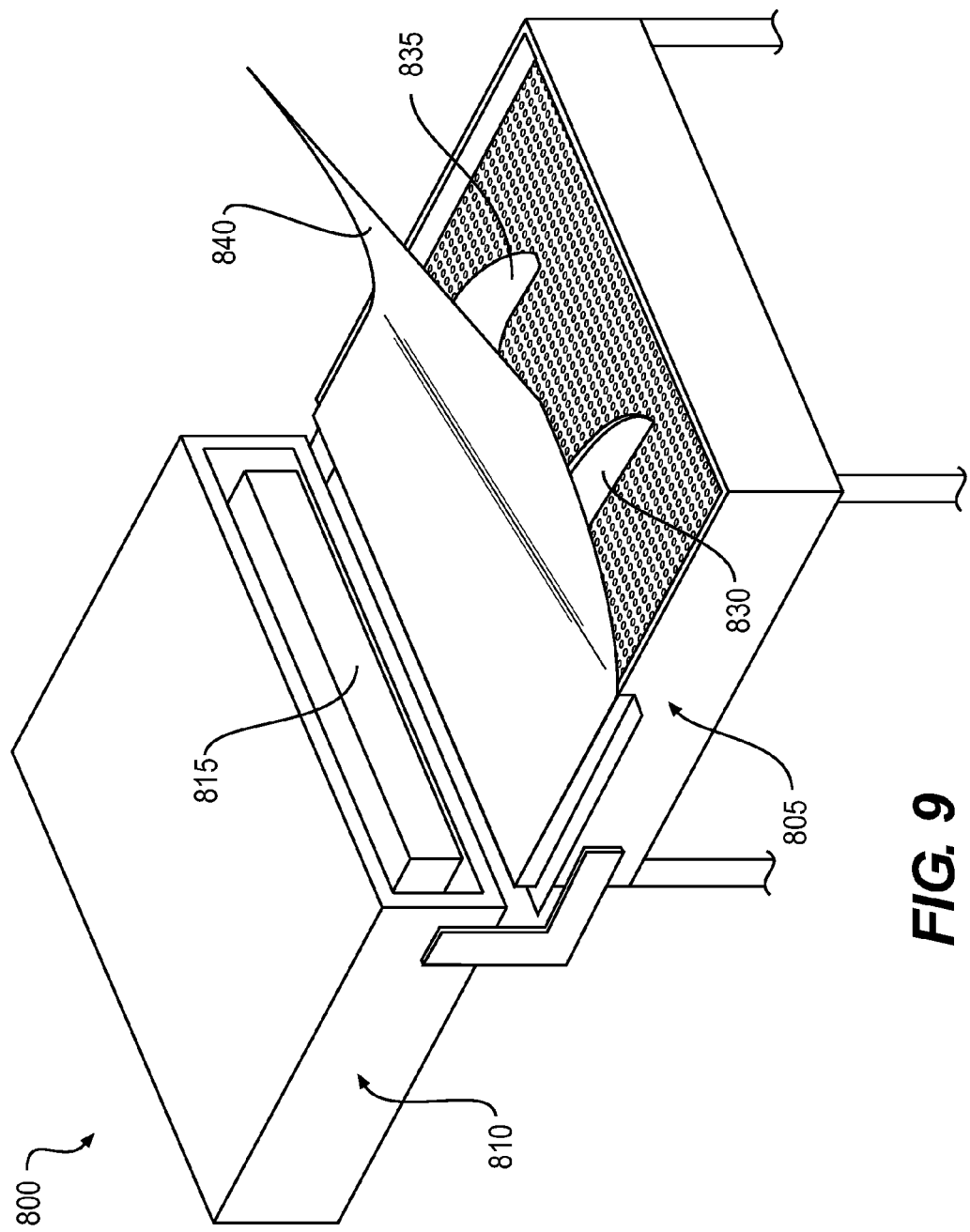
FIG. 9 is a schematic illustration of a step of inserting a sheet of upper material into the vacuum forming apparatus of FIG. 8.
Figure 10:
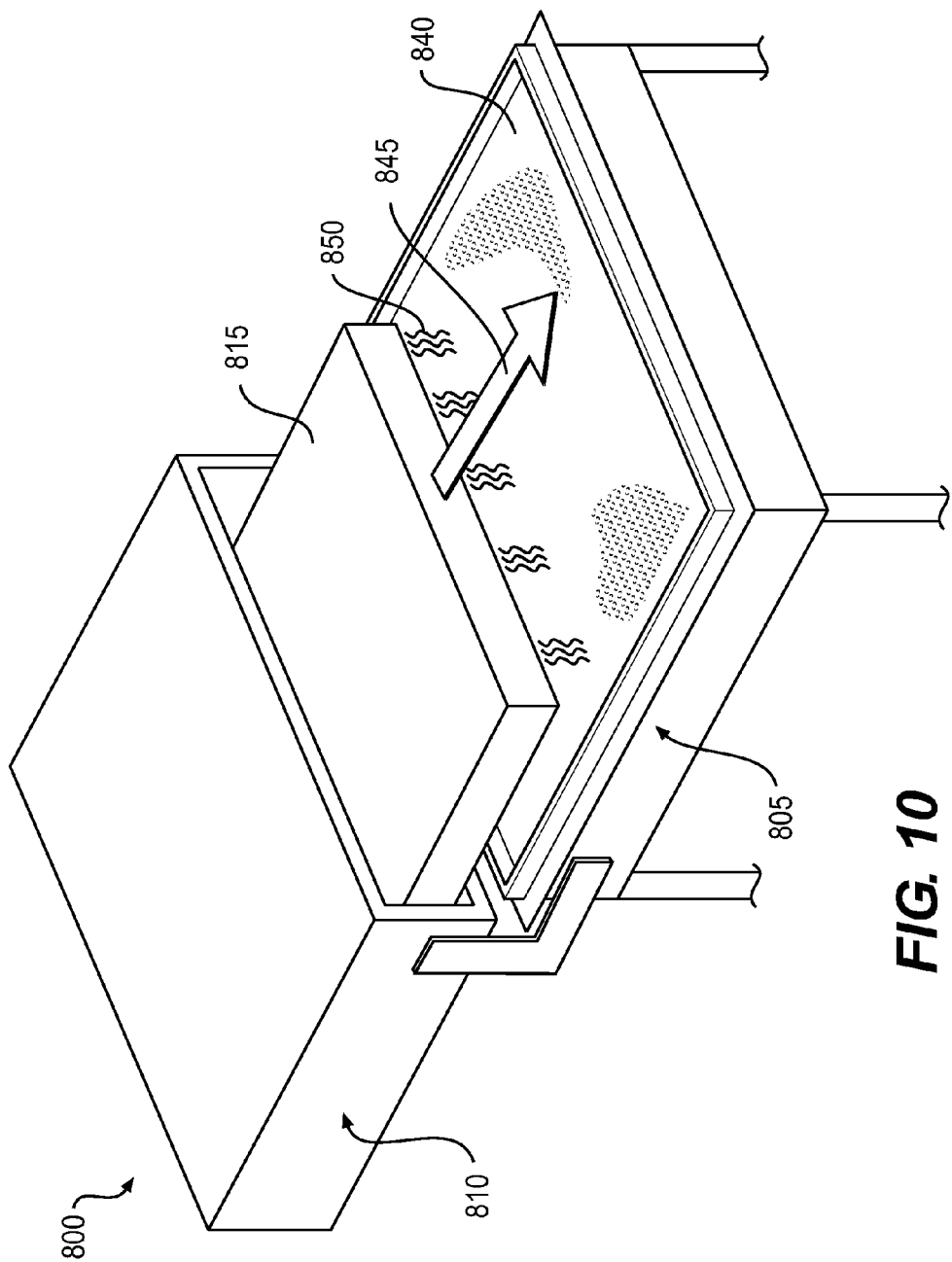
FIG. 10 is a schematic illustration of a step of heating the sheet of upper material in the vacuum forming apparatus of FIG. 8.

As shown in FIG. 9, a sheet of upper material 840 may be placed in apparatus 800 over first last portion 830 and second last portion 835. Sheet 840 may be sealed about vacuum application component 805, thereby forming a chamber divided by the perforated partition.

After sheet 840 is positioned and sealed in apparatus 800, heating device 815 may be extended from heat application component 810, as indicated by an arrow 845. Heating device 815 may then apply heat to sheet 840, as indicated by wavy lines 850. Although, heating device 815 is shown as only being partially extended from heat application component 810, heating device 815 may be extended to fully cover sheet 840, and therefore apply heat to the entirety of sheet 840.

Figure 11:
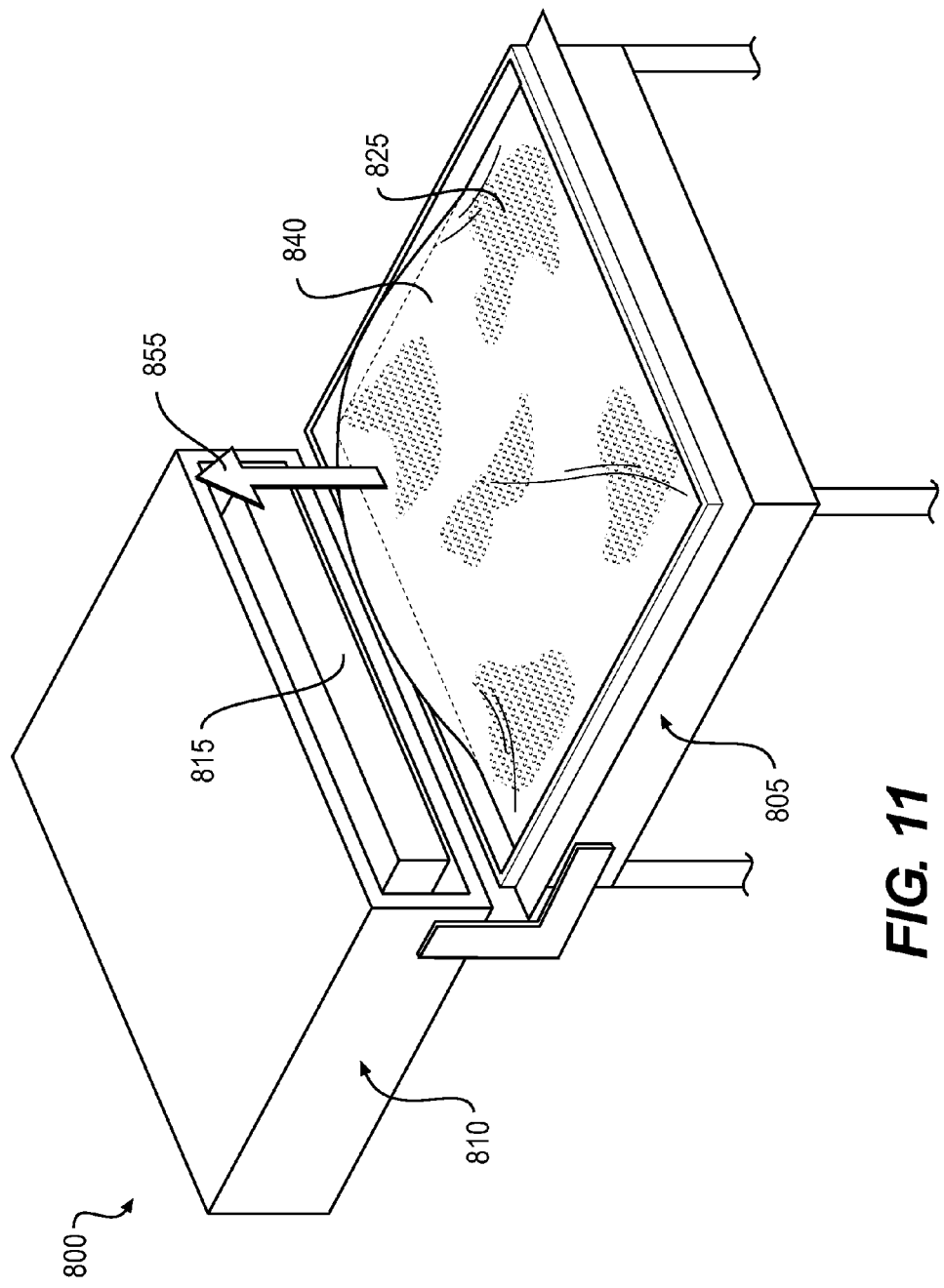
FIG. 11 is a schematic illustration of a step of stretching the sheet of upper material in the vacuum forming apparatus of FIG. 8.

As shown in FIG. 11, air may be introduced to the chamber under sheet 840 via perforations 825. The introduction of air may expand sheet 840 by stretching it upward, as indicated by an arrow 855. This application of heat and pre-stretching of sheet 840 may increase the pliability and flexibility of sheet 840 in preparation for the vacuum forming step. Accordingly, sheet 840 may better conform to the last portions, and thus, the vacuum forming step may be performed without substantially thinning or bunching sheet 840.

Figure 12:
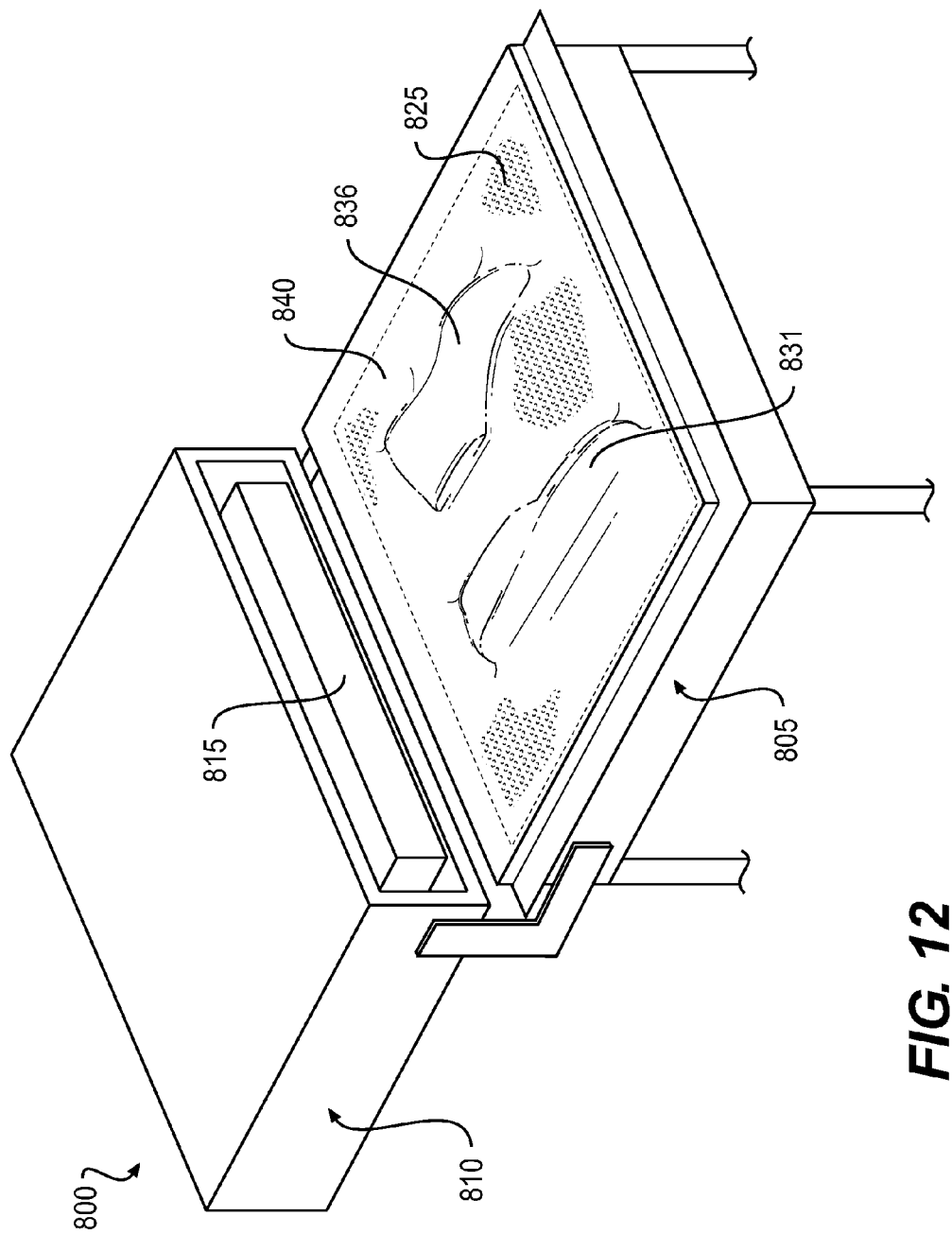
FIG. 12 is a schematic illustration of a step of drawing the sheet of upper material against the portions of footwear last shown in FIG. 8.

Following the heating and pre-stretching of sheet 840, a vacuum may be applied to draw sheet 840 against the perforated partition and the last portions. FIG. 12 illustrates a step of drawing sheet 840 against the portions of footwear last shown in FIG. 8. As shown in FIG. 12, by suctioning air down through perforations 825, to create a vacuum under sheet 840, thus subjecting sheet 840 to a pressure differential between the atmospheric pressure above sheet 840 and the vacuum below sheet 840. Under the influence of the pressure differential, sheet 840 may be drawn into contact with and in conformity to the last portions. FIG. 12 shows a first partially formed upper portion 831 and a second partially formed upper portion 836.

Figure 13:
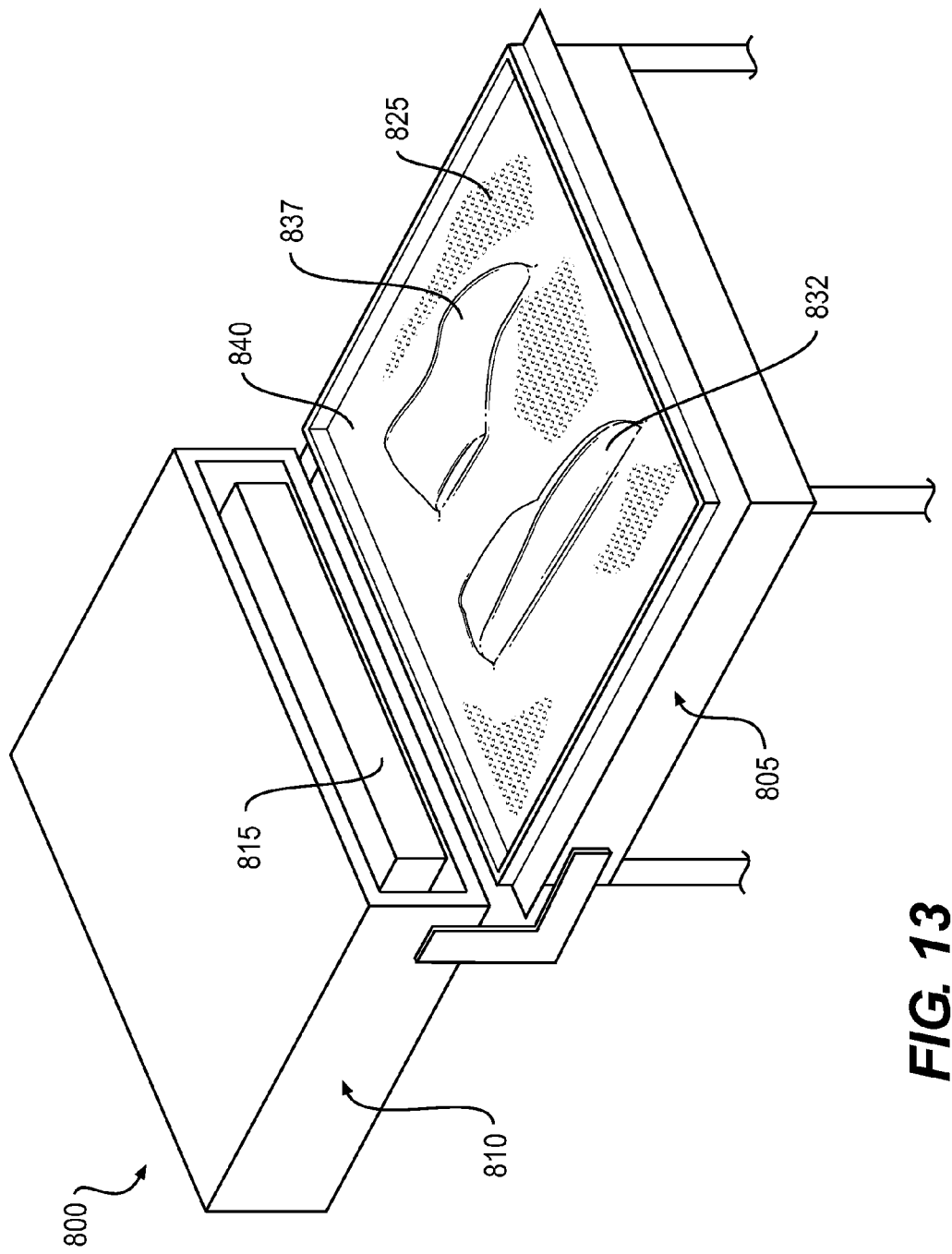
FIG. 13 is a schematic illustration of the sheet of upper material drawn against the portions of footwear last shown in FIG. 8.
Figure 14:
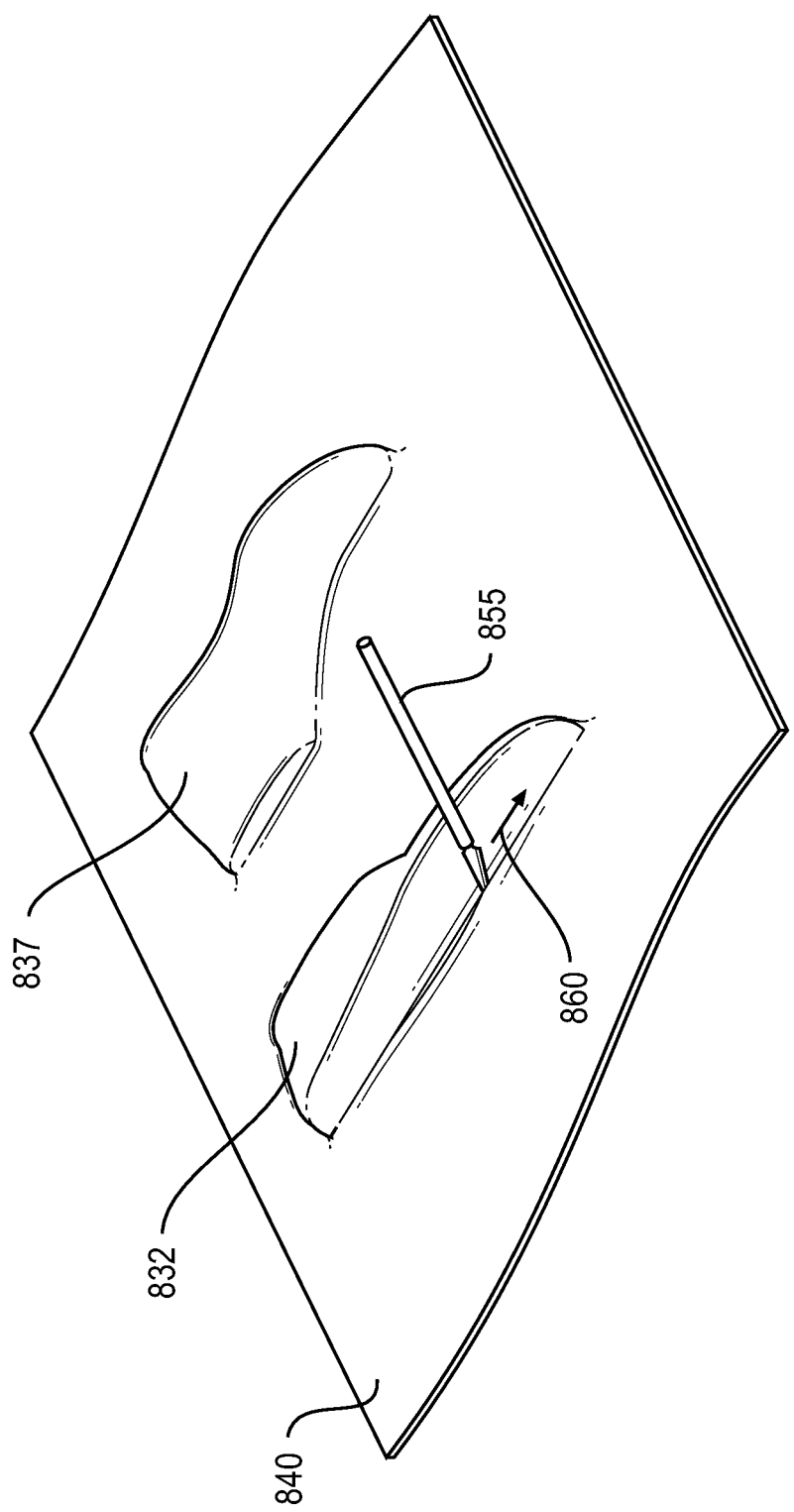
FIG. 14 is a schematic illustration of the sheet of upper material having portions of a footwear upper vacuum formed into the sheet, and a schematic representation of a vacuum formed upper portion being cut out of the sheet.

FIG. 13 shows sheet 840 fully drawn against the last portions to form a first upper portion 832 and a second upper portion 837. As shown in FIG. 14, first upper portion 832 and second upper portion 837 may be removed from sheet 840. For example, as shown in FIG. 14, a cutting instrument 855 may be used to cut around the edges of first upper portion 832 and second upper portion 837, as indicated by an arrow 860. It will be understood, however, that this cutting step may be performed in any suitable manner, such as die cutting, laser cutting, or other cutting processes. The method of forming the article of footwear may further include assembling the article of footwear by joining first upper portion 832 and second upper portion 837 to one another to form an upper. The method may also include fixedly attaching the upper to a sole structure. (See FIGS. 1 and 2.)

Figure 15:
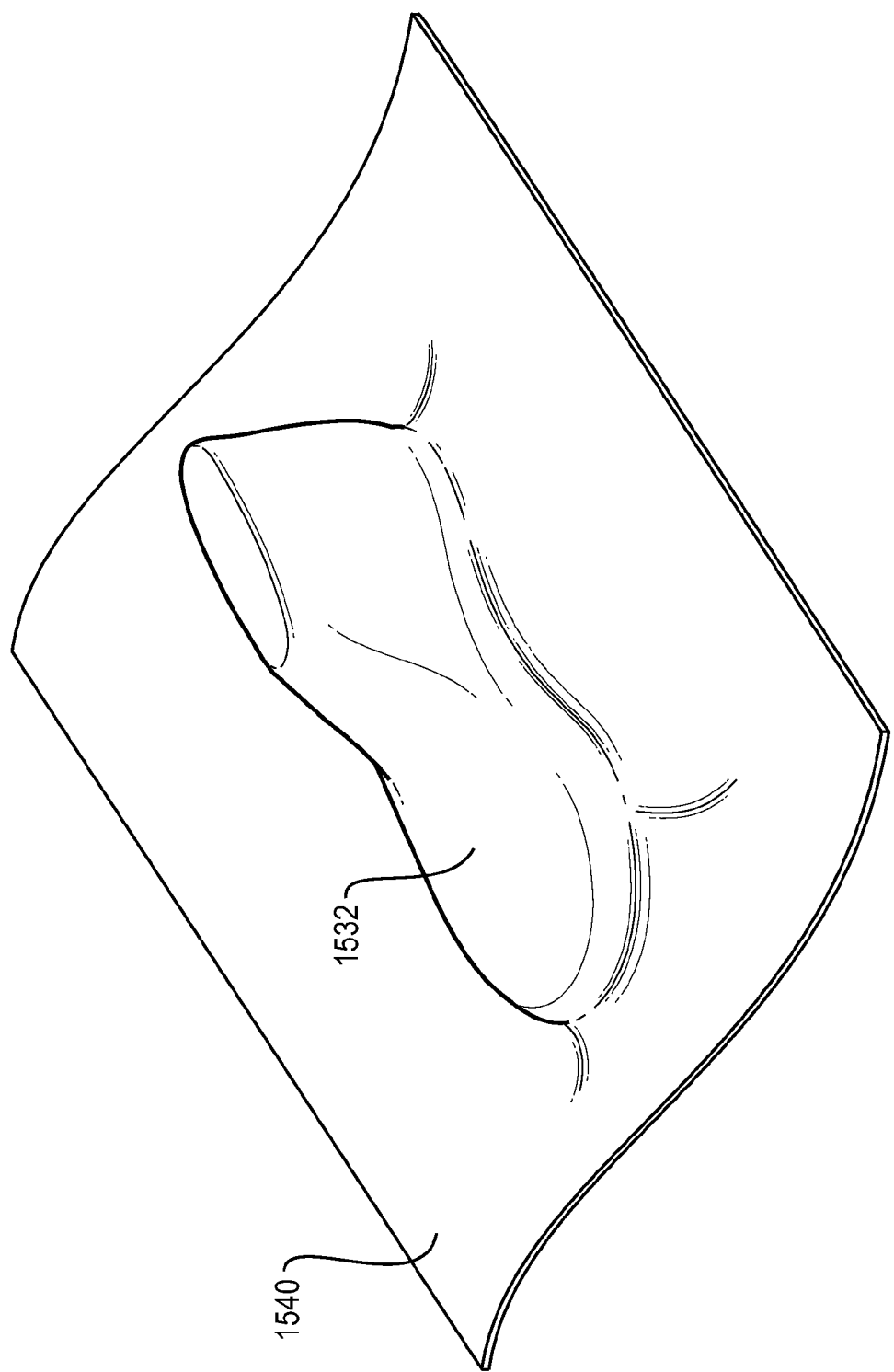
FIG. 15 is a schematic illustration of the sheet of upper material of FIG. 14 having a footwear upper vacuum formed into the sheet.

In some embodiments, a complete one-piece upper may be formed about a one-piece last. Such a one-piece upper may omit seams, and thus, may omit additional weight and manufacturing steps used to form such seams. FIG. 15 illustrates a sheet of upper material 1540 having a one-piece footwear upper 1532 vacuum formed into sheet 1540. In other embodiments, three or more last portions may be used to vacuum form multiple portions of the same upper, which may be subsequently assembled as described above.

In some embodiments, the vacuum forming apparatus may include a fully sealed chamber that is divided into a first compartment and a second compartment by the sheet of upper material itself. The environmental pressure within the first compartment and the second compartment may be independently regulated to subject the sheet of upper material to a pressure differential.

Figure 16:
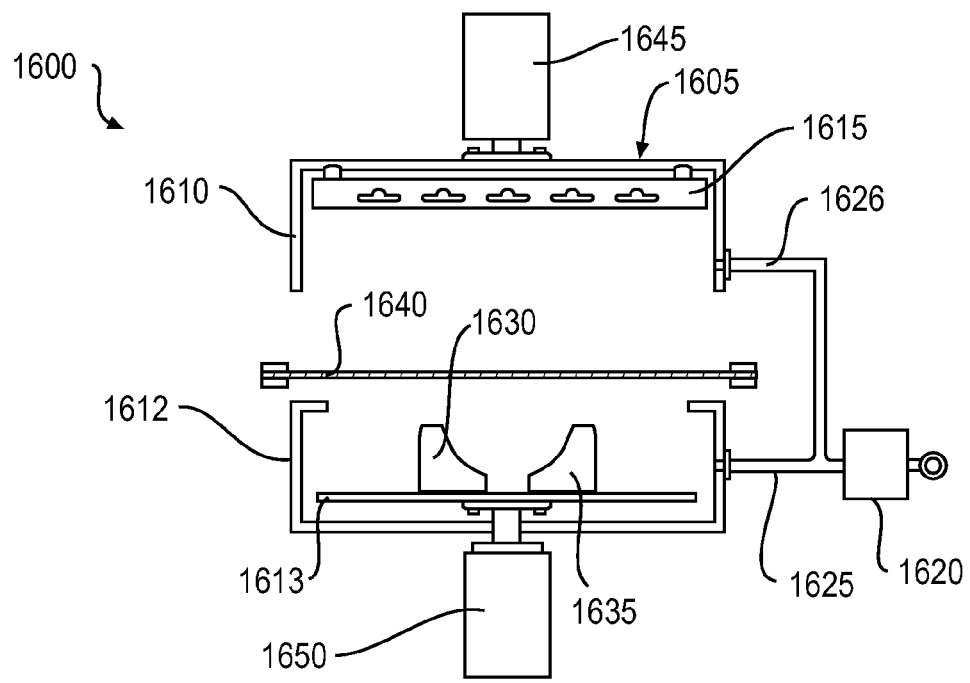
FIG. 16 is a schematic cross-sectional view of a sheet of upper material being inserted into another vacuum forming apparatus.

FIG. 16 is a schematic cross-sectional view of a sheet of upper material 1640 being inserted into a vacuum forming apparatus 1600. Apparatus 1600 may include a chamber 1605 formed by an upper chamber structure 1610 and a lower chamber structure 1612. (It will be understood that these chamber structures may be disposed horizontally opposed to one another in some embodiments.) Apparatus 1600 may also include a heating device 1615, a pressure regulation device 1620. Pressure regulation device 1620 may be configured to communicate with chamber 1605 via a first conduit 1625 and a second conduit 1625.

As also shown in FIG. 16, apparatus 1600 may further include a platform 1613 on which a first footwear last portion 1630 and a second footwear last portion 1635 may be positioned. In addition, apparatus 1600 may include a first actuator 1645 configured to move upper chamber structure 1610 to open and close chamber 1605. In addition, apparatus 1600 may include a second actuator 1650, which may be configured to raise and lower platform 1613.

Figure 17:
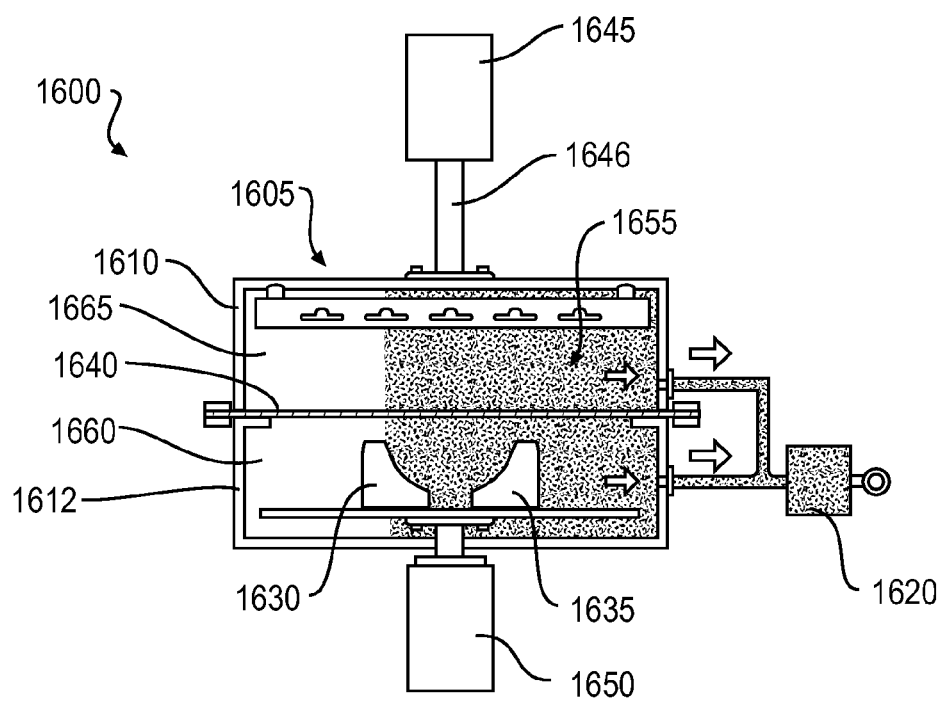
FIG. 17 is a schematic cross-sectional view of a vacuum being drawn from a chamber within the vacuum forming apparatus of FIG. 16.

As shown in FIG. 17, first actuator 1645 may extend a first piston 1646 to close chamber 1605. With chamber 1605 closed and sealed about the periphery of sheet 1640, sheet 1640 may divide chamber 1605 into a first compartment 1660 on a first side of sheet 1640 and a second compartment 1665 on a second side of sheet 1640. As shown in FIG. 17, atmospheric air 1655 may be removed from chamber 1605, creating a vacuum in both first compartment 1660 and second compartment 1660.

Figure 18:
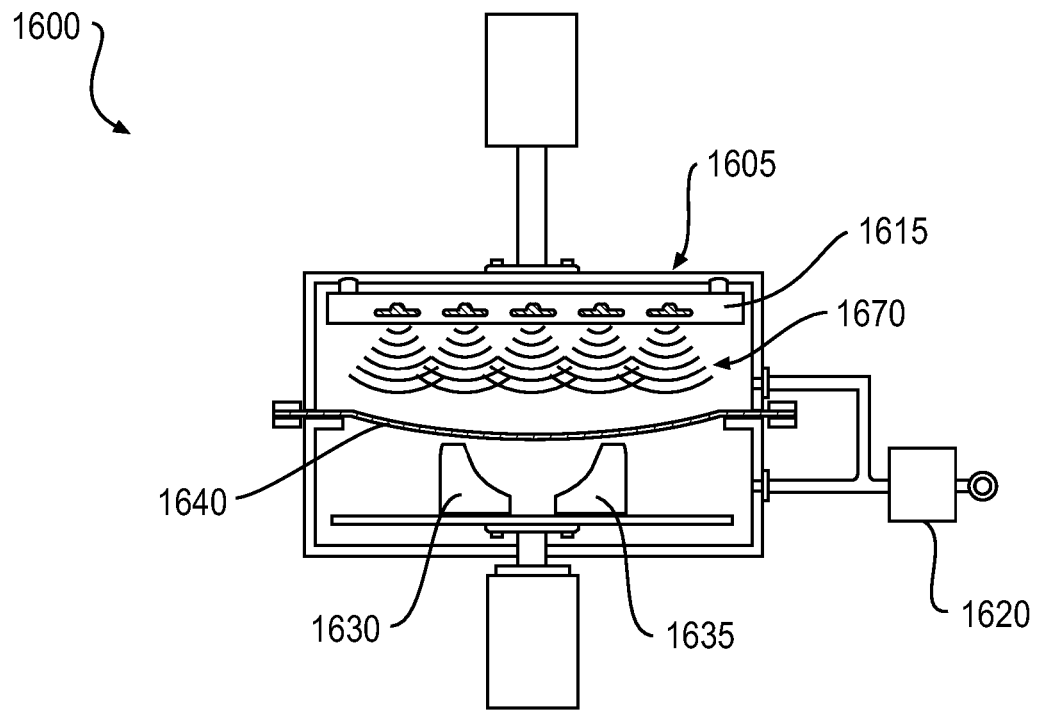
FIG. 18 is a schematic cross-sectional view of the sheet of upper material being heated within the chamber within the vacuum forming apparatus of FIG. 16.
Figure 19:
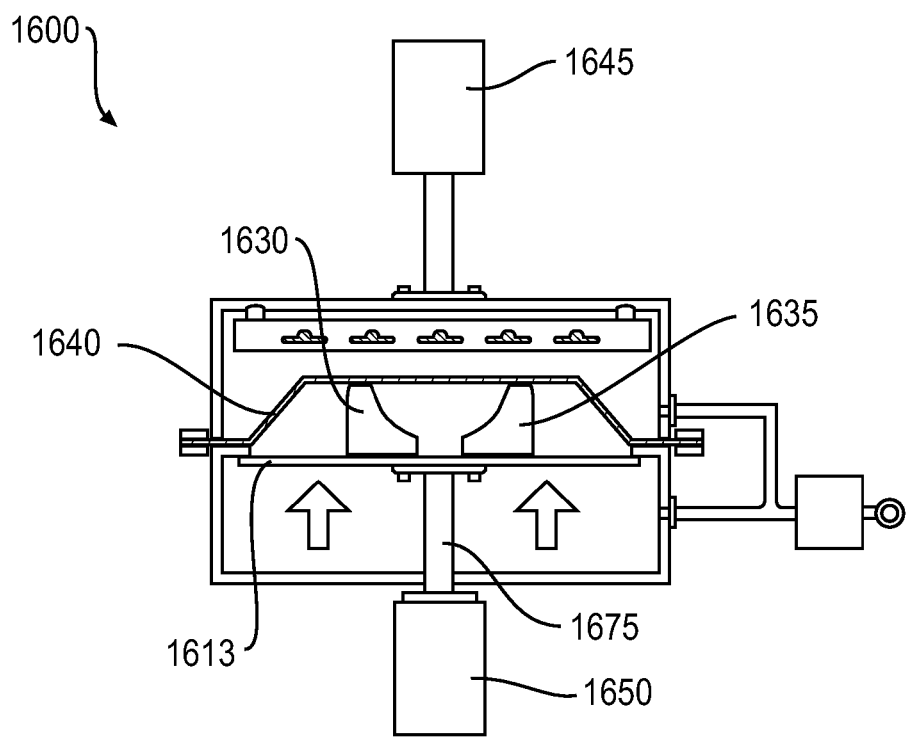
FIG. 19 is a schematic illustration of portions of footwear lasts being raised into position proximate the sheet of upper material within the vacuum forming apparatus of FIG. 16.

As shown in FIG. 18, once a vacuum is drawn within chamber 1605, heat may be applied to sheet 1640 by heating device 1615, as indicated by heat waves 1670. As also shown in FIG. 18, sheet 1640 may droop under its own weight, particularly when being heated. If beneficial, the droop may be corrected by controlling the relative pressurization of the compartments using pressurization device 1620. Once the heating is complete, second actuator 1650 may extend a second piston 1675 to raise platform 1613, bringing first last portion 1630 and second last portion 1635 into contact with sheet 1640, as shown in FIG. 19.

Figure 20:
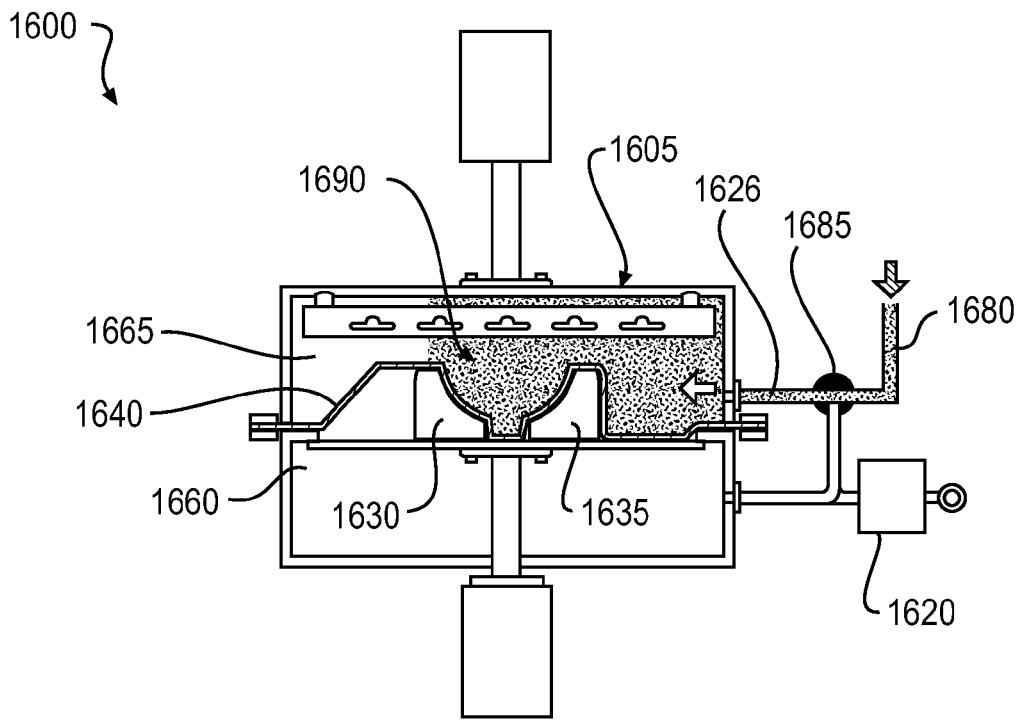
FIG. 20 is a schematic illustration of gasses being allowed to reenter the chamber within the vacuum forming apparatus of FIG. 16.

As shown in FIG. 20, atmospheric air 1690 (or other gases) may be allowed to return into second compartment 1665 through an introduction port 1680 and a pressure regulation valve 1685. This creates an environmental pressure differential between first compartment 1660, in which a vacuum has been drawn, and second compartment 1665. Thus, first compartment 1660 may have a first environmental pressure that is lower than a second environmental pressure in second compartment 1665. Under the pressure differential, sheet 1640 may be drawn into contact with, and in conformity to, first last portion 1630 and second last portion 1635, as shown in FIG. 20. That is, sheet 1640 may have a first surface on the first side of the sheet (facing first compartment 1660) and a second surface on a second side of the sheet (facing second compartment 1665). Gases under the second environmental pressure may exert force against the entire second surface of sheet 1640 within second compartment 1665, thereby pressing the first side of sheet 1640 against first last portion 1630 and second last portion 1635, thereby conforming a portion of sheet 1640 to the surface of the footwear last portions to form at least a portion of an upper of an article of footwear.

Figure 21:
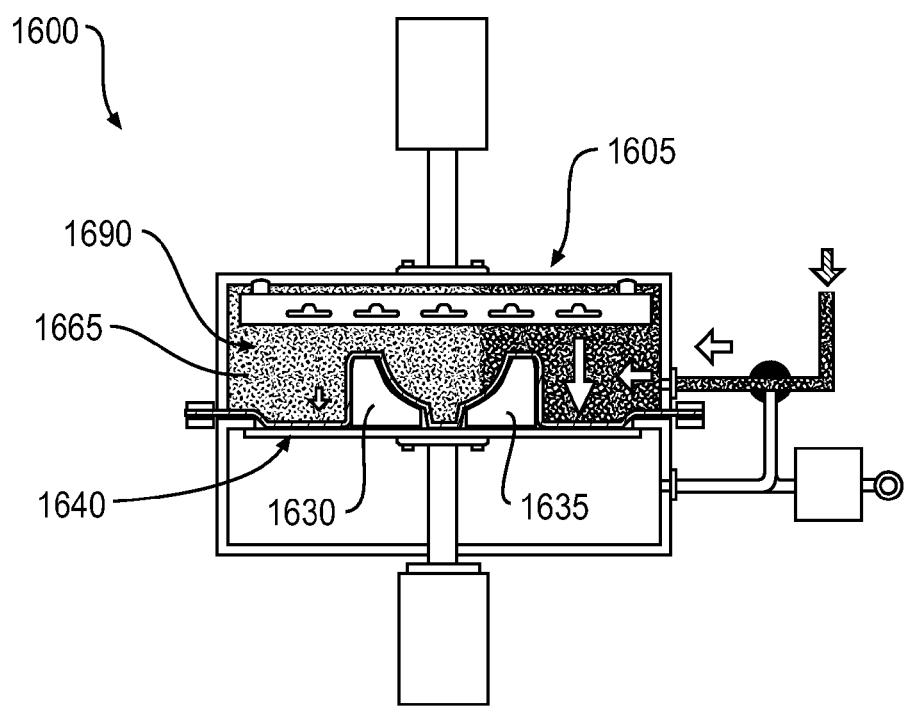
FIG. 21 is a schematic illustration of pressurized gasses being introduced into the chamber within the vacuum forming apparatus of FIG. 16.
Figure 22:
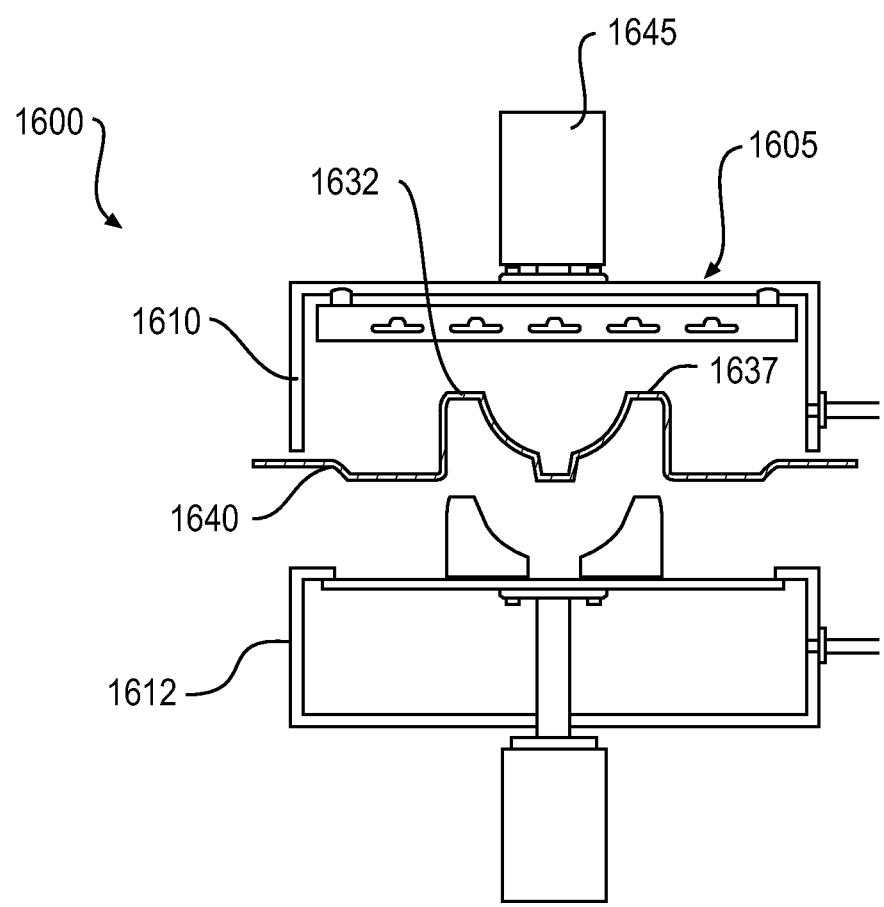
FIG. 22 is a schematic illustration of the vacuum formed sheet of upper material being removed from the vacuum forming apparatus of FIG. 16.

In order to provide further vacuum forming of sheet 1640, second compartment 1665 may be further pressurized with gases above atmospheric pressure, as shown in FIG. 21. This may ensure that sheet 1640 is fully conformed to first last component 1630 and second last component 1635.

Once sheet 1640 is fully vacuum formed, chamber 1605 may be returned to atmospheric pressure and first actuator may raise first chamber structure 1610 so that sheet 1640 may be removed from apparatus 1600. Following the vacuum forming process, a first vacuum formed upper portion 1632 and a second vacuum formed upper portion 1637 of sheet 1640 may be removed and joined to one another to form the upper, and the upper may be fixedly attached to a sole structure, as described above. (See FIGS. 1 and 14.)

While various embodiments have been described, the description is intended to be exemplary, rather than limiting and it will be apparent to those in the art that many more embodiments and implementations are possible that are within the scope of the current embodiments. Accordingly, the current embodiments are not to be restricted except in light of the attached claims and their equivalents. Features described in one embodiment may or may not be included in other embodiments described herein. Also, various modifications and changes may be made within the scope of the attached claims.

The invention claimed is:

1. A method of forming a footwear upper, the method comprising:
    applying an environmental pressure differential across a sheet of upper material disposed within a first compartment of a chamber to conform the sheet to a first portion of a footwear last disposed within the first compartment and to a second portion of the footwear last that is disposed separately from and spaced apart from the first portion within the first compartment, thereby forming a first component and a second component that are spaced apart from one another within the sheet;
    wherein applying the environmental pressure differential includes:
        drawing a vacuum on a first side of the sheet to thereby draw the first side into contact with the first portion and the second portion;
        drawing a vacuum on a second side of the sheet while drawing the vacuum on the first side; and
        after drawing the vacuum on the first side and drawing the vacuum on the second side, applying an atmospheric pressure on the second side;
    wherein the first component has a first thickness that is consistent along an entirety of the first component, and further wherein the second component has a second thickness that is equal to the first thickness and is consistent along an entirety of the second component; and
    joining the first component and the second component to form the footwear upper.

2. The method of claim 1, wherein forming the first component includes forming a medial half of the footwear upper and wherein forming the second component includes forming a lateral half of the footwear upper; and
    wherein joining includes forming a seam between the medial half and the lateral half.

3. The method of claim 2, wherein joining the medial half of the footwear upper to the lateral half of the footwear upper includes affixing at least one reinforcing strip to the medial half of the footwear upper and the lateral half of the footwear upper at the seam.

4. The method of claim 2, wherein joining includes welding the medial half to the lateral half to form a thermal bond between the medial half and the lateral half.

5. The method of claim 1, further including increasing the environmental pressure differential by pressurizing the second side to a pressure above the atmospheric pressure.

6. A method of forming a footwear upper, the method comprising:
    positioning a sheet of upper material having a first side and a second side within a chamber, the sheet dividing the chamber into a first compartment on the first side and a second compartment on the second side;
    positioning a footwear last having a first portion and a second portion that is separate from, spaced apart from, and non-contiguous with the first portion in the first compartment on the first side;
    applying an environmental pressure differential across the sheet wherein a first environmental pressure in the first compartment is lower than a second environmental pressure in the second compartment;
    wherein applying the environmental pressure differential includes:
        drawing a vacuum in the first compartment;
        drawing a vacuum in the second compartment while drawing the vacuum in the first compartment; and
        after drawing the vacuum in the first compartment and drawing the vacuum in the second compartment, applying the second environmental pressure on the second side;

wherein the environmental pressure differential draws the sheet against the footwear last thereby forming a first component and a second component that are spaced apart from one another within the sheet;

wherein the first component has a first thickness that is consistent along an entirety of the first component, and further wherein the second component has a second thickness that is equal to the first thickness and is consistent along an entirety of the second component; and joining the first component and the second component to form the footwear upper.

7. The method of claim 6, wherein joining includes forming a one-piece footwear upper.

8. The method of claim 6, wherein forming the first component includes forming a medial portion of the footwear upper and wherein forming the second component includes forming a lateral portion of the footwear upper.

9. The method of claim 8, further including:
joining the medial portion and the lateral portion to thereby form a seam; and
fixedly attaching the footwear upper to a sole structure to thereby form an article of footwear.

10. The method of claim 9, wherein joining the medial portion to the lateral portion includes affixing at least one reinforcing strip to the medial portion and the lateral portion at the seam.

11. The method of claim 9, wherein joining includes welding the medial portion to the lateral portion to form a thermal bond between the medial portion and the lateral portion.

12. The method of claim 6, further including increasing the environmental pressure differential by pressurizing the second compartment to a pressure above the second environmental pressure.

13. A method of forming a footwear upper, the method comprising:
positioning a sheet of upper material having a first surface on a first side and a second surface on a second side within a chamber, the sheet dividing the chamber into a first compartment on the first side and a second compartment on the second side;
positioning a footwear last having a first portion and a second portion that is separate from the first portion in the first compartment on the first side;
applying an environmental pressure differential across the sheet, wherein a first environmental pressure in the first compartment is lower than a second environmental pressure in the second compartment;
wherein applying the environmental pressure differential includes:
drawing a vacuum in the first compartment;
drawing a vacuum in the second compartment while drawing the vacuum in the first compartment; and
after drawing the vacuum in the first compartment and drawing the vacuum in the second compartment, applying the second environmental pressure on the second side;
wherein gases under the second environmental pressure exert a force against the entire second surface within the first compartment, thereby pressing the first side against the footwear last and conforming the sheet to the footwear last to form a first component and a second component that are spaced apart from one another within the sheet;
wherein the first component has a first thickness that is consistent along an entirety of the first component, and further wherein the second component has a second thickness that is equal to the first thickness and is consistent along an entirety of the second component; and
joining the first component and the second component to form the footwear upper.

14. The method of claim 13, wherein joining includes forming a one-piece footwear upper.

15. The method of claim 13, wherein forming the first component includes forming a medial portion of the footwear upper and wherein forming the second component includes forming a lateral portion of the footwear upper.

16. The method of claim 15, further including:
joining the medial portion to the lateral portion to thereby form a seam; and
fixedly attaching the footwear upper to a sole structure to thereby form an article of footwear.

* * * * *